Patented Feb. 14, 1950

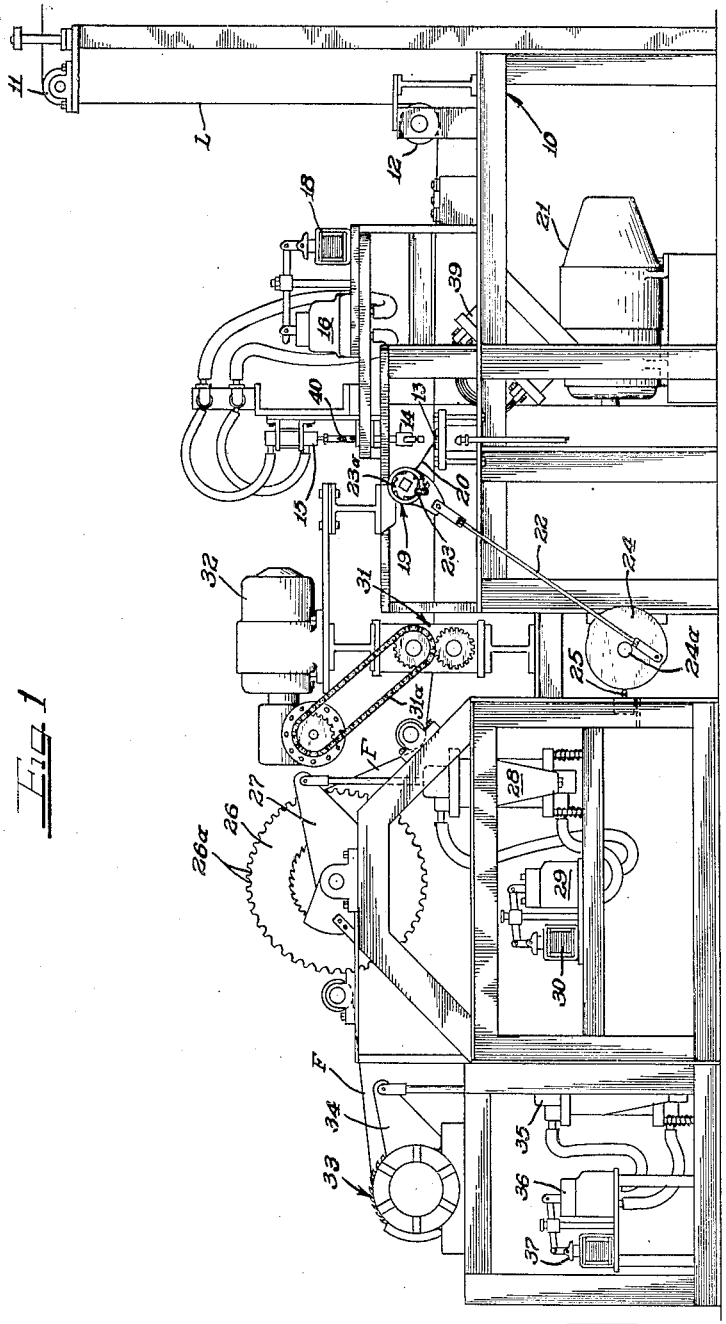

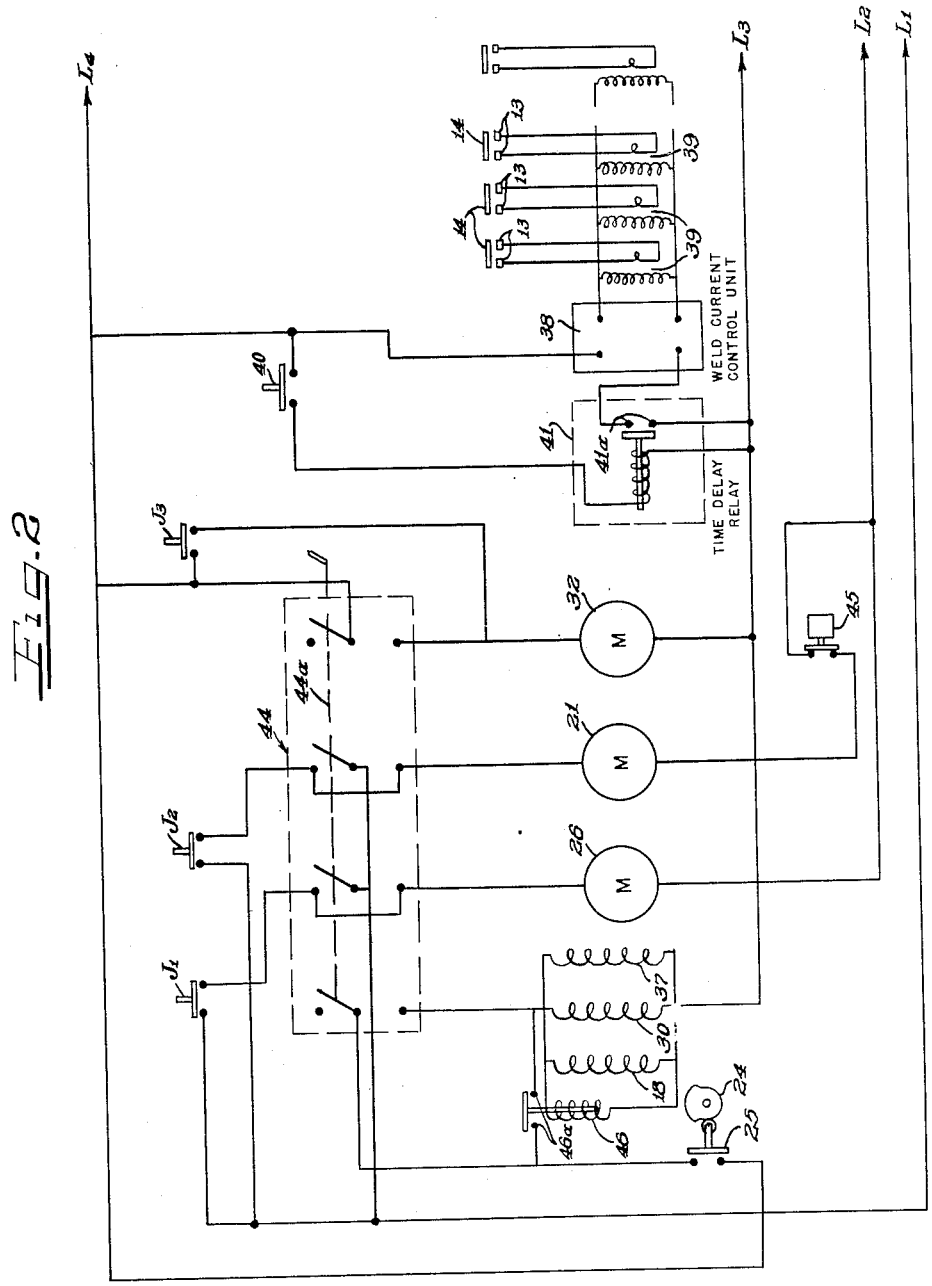

2,497,260

UNITED STATES PATENT OFFICE 2,497,260

ELECTRICAL CONTROL FOR FENCE WELDING MACHINES

Harry E. Griesemer, Bloomington, Ill., assignor to Northwestern Steel and Wire Company, Sterling, Ill., a corporation of Illinois Application July 8, 1948, Serial No. 37,644

6 Claims. (Cl. 219—4)

This invention relates to a machine for producing welded fence, and particularly to an improved electrical control circuit for effecting the automatic operation of such machine.

The automatic production of fence by successive welding of cross wires to a plurality of spaced line wires requires a relatively complicated machine having a plurality of prime movers and a source of welding current which must be very accurately controlled to operate in proper sequence and in synchronized relationship to each other. For example, a well known form of fence welding machine incorporates a solenoid controlled, hydraulic drive for the pull up drum by which the line wires are advanced through the machine, a solenoid controlled, hydraulic drive on the reel upon which the completed fence is rolled, an electric motor drive for feeding cross wires successively into a welding position relative to the line wires, a spinning motor for driving a device for removing kinks from the cross wire as it is fed into the machine, a slitting and trimming motor for driving rotary knives for effecting edge trimming of the completed fence and the slitting of the fence into two or more sections and lastly, solenoid controlled hydraulic cylinders for shifting the movable electrodes of a plurality of pairs of welding electrodes which achieve the welding of the junctures of the cross wire with the line wires. All of the foregoing movable parts must be electrically controlled so that each moves in proper sequence in each cycle of operation performed by the machine. As a further complication, it is generally desirable that the welding current be applied to the junctures of the cross and line wires only after such junctures are squeezed together by the electrodes, and that the welding current be interrupted a substantial period before the squeezing action of the electrodes thereupon is released. A still further complication in the control of the fence welding machine is occasioned by the fact that in the initial set up and adjustment of the machine it is often necessary that the prime movers which control the position of the line wires and the completed fence be capable of manual actuation or "jogging" independently of the operation of the other prime movers and without operating the welding circuit.

Accordingly, it is an object of this invention to provide a control circuit for a welding machine of the fence making type characterized by the unusual simplicity of the control circuit in relationship to the multiplicity of functions performed by the control circuit and unusual reliability of its performance.

Still another object of this invention is to provide an improved electric control circuit for a fence welding machine wherein certain of the prime mover elements of the machine are susceptible of manually controlled "jogging" actuation to facilitate the initial adjustments and set up of the machine.

Still another object of this invention is the provision of a control circuit for a fence making welding machine wherein the application of welding current to the wire junctures is delayed until a squeezing pressure is applied to such junctures by the cooperating electrodes and is interrupted prior to the release of such squeezing pressure by the electrodes.

The specific nature of the invention as well as other objects and advantages thereof will become apparent to those skilled in the art from the following detailed description of the annexed sheets of drawings which, by way of preferred example only, illustrate one specific embodiment of the invention.

On the drawings:

Figure 1 is a side elevational view, with some components omitted for clarity, of a well known form of fence making welding machine to which the control circuit embodying this invention is applicable; and Figure 2 is a schematic diagram of the control circuit for a fence making welding machine embodying this invention.

As shown on the drawings:

As will be understood by those skilled in the art, the necessary components of a fence making welding machine are assembled upon an articulated framework 10 formed by the welded or riveted assemblage of structural steel elements. No attempt has been made to show all components of such machine in Figure 1, inasmuch as any components not shown are of commonly known construction and form no part of this invention. Thus, a plurality of transversely spaced line wires L are fed into the machine from a bank of suitable supply reels (not shown) over guide pulleys 11 and 12 which are suitably journaled at one end of the frame structure 10. The line wires L are pulled across a transverse bank of stationary electrodes 13 which are respectively disposed immediately beneath vertically movable electrodes 14 whose movements are controlled by a conventional hydraulic cylinder 15.

Preferably, each movable electrode 14 cooperates with two fixed electrodes 13 to form a series welding circuit through two sets of wire junctures, in the manner described and claimed in the copending application of Rudolph C. Vorderstrasse, Serial No. 19,283 filed April 6, 1948, and assigned to the assignee of this application.

The supply of fluid to cylinder 15 is in turn controlled by a valve 16 which is selectively operated by a control solenoid 18.

Adjacent one of the movable electrodes 14, a limit switch 40 is mounted and arranged so as to close its contacts whenever the movable electrode 14 is shifted into its welding position with respect to the fixed electrode 13 wherein the wire junctures are squeezed therebetween.

Immediately forward of the cooperating welding electrodes 13 and 14 a cross wire feeding mechanism is provided of which only the drive motor 21 and the magazine portion 19 is shown. Such mechanism may comprise any one of several well known forms and functions to successively feed in proper lengths of cross wire into magazine 19 and at timed intervals, permit such wire to roll down a feed ramp 20 to rest upon the line wires L at a position immediately beneath the movable electrode 14. Such cross wire feeding mechanism is driven by a feed motor 21. The magazine 19 is rotatable and is mounted in a position immediately above and in front of the welding electrodes 13 and 14. The cross wire feeding mechanism (not shown) functions to successively position cross wires of proper length in radially spaced peripheral notches (not shown) provided in the rotatable magazine. Magazine 19 is intermittently rotated and hence the cross wires carried in the notches are successively deposited upon the guide ramp 20 and fall into overlying position with respect to the line wires L at a point immediately between the welding electrodes 13 and 14. Intermittent rotation of the magazine 19 is accomplished through a link crank 22, pawl 23 and ratchet 23a. Link 22 has its other end connected to a cam 24 driven by shaft 24a in timed relationship with the feed motor 21. A master control switch 25 is actuated by the periphery of cam 24 and is cyclically opened and closed by the cam 24 in timed relation to the operation of the cross wire feeding mechanism.

As will be understood by those skilled in the art, the cross wire feeding mechanism may also embody a spinning mechanism, which is driven by a suitable motor not shown in Figure 1 but represented schematically at 26 in Figure 2. Such spinning mechanism operates to remove kinks from the cross wire prior to its being deposited in the magazine 19.

After the welding of each successive cross wire to the line wires is accomplished by the welding electrodes 13 and 14, the welded fence F and the connected unwelded portions of line wires L are pulled up by a pull up drum 26 having a grooved periphery 26a. Pull up drum 26 is suitably journaled on the frame 10 and is unidirectionally, intermittently rotated by a pawl and ratchet mechanism 27 which in turn is driven by a hydraulic cylinder 28. Pull up cylinder 28 is controlled by a valve 29 which in turn is actuated by a control solenoid 30.

Intermediate the pull up drum 26 and the welding electrodes 13 and 14, a cutting and slitting mechanism 31 may be provided which is driven in any conventional fashion, as by chains 31a, by a slitting motor 32. Such slitting mechanism may not only effect the trimming of the outer edges of the welded fence but also the cutting of the fence into two or more widths.

Lastly, a reeling mechanism is provided comprising a reel 33 upon which the completed fence is wound and such reel is actuated by ratchet and pawl mechanisms 34 driven by hydraulic cylinder 35. Reel cylinder 35 is controlled by a fluid valve 36 which in turn is controlled by a solenoid 37.

Any suitable source of welding current may be employed in conjunction with the fixed and movable electrodes 13 and 14. However, for optimum results, it is preferred to employ a separate welding transformer 39 with each set of welding electrodes and to control the energization of such welding transformers so that a predetermined number of cycles of current will flow to effect the weld and, if desired, such current may be further phase-controlled so that the current flows only through a predetermined portion of each cycle. Circuit arrangements for effecting such control of the welding circuit are well known and form no part of this invention, and hence have been indicated schematically in the circuit diagram of Figure 2 by the block 38 labeled "Weld current control unit." The welding transformers 39 may be conveniently mounted directly on the machine, positioned to the rear of the fixed electrodes 13.

Referring now to Figure 2, corresponding numerals in this diagram refer to similarly identified elements of Figure 1. This figure shows the circuit connections of the feed motor 21, the spinner motor 26, the slitter motor 32, the solenoids 18 which control the movements of the electrodes 14, the solenoid 30 which controls the pull up cylinder 28, and the solenoid 37 which controls the reeling cylinder 35. Likewise there is shown the circuit connections of the cam switch 25 which is controlled by the master control cam 24, as well as the welding current control unit 38, the various transformers 39 and their respective electrodes 13 and 14, and the electrode operated limit switch 40.

Those skilled in the art will understand that the circuit diagram shown in Figure 2 is largely schematic in nature and that in practical installations, there may be additional relays or controllers interposed in circuit connection with the various motors and solenoids there shown. For simplicity in understanding the operation of the circuit, the motors and solenoids have been shown as directly connected in the control circuit rather than through intermediate contactors.

Two sources of voltage are employed in the control circuit, respectively a relatively high voltage source, such as 440 volts A. C., applied to terminals L1 and L2 and a relatively lower voltage source, such as 220 volts A. C., applied to terminals L3 and L4.

Tracing out the circuits shown in Figure 2, it will be apparent that welding current is applied to each of the several pairs of electrodes 13 and 14 upon the closure of the electrode limit switch 40 which is shifted to its closed contact position when the movable electrodes 14 are shifted to their welding position by their associated hydraulic cylinders 15. Closure of switch 40 energizes a time delay relay 41 across the low voltage source L3 and L4. After a predetermined time delay, relay 41 closes its normally open contacts 41a to energize the welding current control unit 38. The welding control unit 38 then functions in a well known manner to supply a predetermined number of cycles of welding current to each of the cooperating pairs of electrodes 13 and 14 through the welding transformers 39. Hence the initiation of welding current is dependent entirely upon the actuation of the limit switch 40, which in turn depends upon the shifting of the movable electrodes 14 to their welding position.

The control of the movable electrodes 14 through the associated solenoid 18 is accomplished by the same circuit as controls the energization of the pull up drum solenoid 30 and the reel solenoid 37. All three of these solenoids are connected across control voltage source L3 and L4 through two contacts and the cooperating blade of a quadruple pole, double throw master manual control switch 44 and through the series connected contacts of the cam controlled switch 25. The central position of the blade 44a of master control switch 44 is the "off" position and all elements of the circuit are deenergized. In the lowermost blade position, designated as the "run" position, all three of the solenoids 18, 30 and 37 are placed in condition for energization upon the next closure of the cam controlled switch 25. In this same position of the master control switch 44, the trimmer motor 32 is connected across power source L3 and L4 and the feed motor 21 and spinner motor 26 are each connected across the high voltage power source L1 and L2. As a safety factor, a normally closed flow switch 45 is connected in series with the cross feed motor to prevent the energization of this motor in the event of failure of cooling water supply to the welding electrodes of the machine.

The energization of the feed motor 21 of course produces the operation of the cross wire feeding mechanism and also the rotation of the master cam 24. When such cam rotates sufficiently to close the contacts of the control switch 25 associated therewith, the electrode control solenoid 18, the pull up drum solenoid 30, and the reel solenoid 37 are simultaneously energized. In addition, a self-locking connection is closed around the contacts of the master manual switch 44 by the energization of a relay 46 to close its normally open contacts 46a. The purpose of this self-locking circuit will be brought out later.

The machine then proceeds to complete one cycle of operation and is under the primary control of the cam controlled switch 25. As previously mentioned, the energization of the electrode solenoid 18 actuates cylinder 15 to shift all of the movable electrodes 14 into their welding position with respect to the fixed electrodes 13, and effects the squeezing of the wire junctures of the cross and line wires therebetween. This movement effects the closure of the limit switch 40 and the resultant energization of the welding control unit 38 and the flow of a predetermined amount of welding current through each set of cooperating electrodes. The welding control unit 38 of course interrupts the flow of welding current after a predetermined number of cycles. The contour of master cam 24 is so proportioned as to insure that the movable electrodes 14 will be maintained in squeezing relationship with respect to the wire junctures for a substantial period after the flow of welding current has ceased. This arrangement has been found to effect a very substantial improvement in the quality of the welds obtained.

In addition to the "off" and "run" positions of the blade of master manual switch 44, such switch is provided with a "test" position, which is the upper position shown in Figure 2. In such test position, energizing circuits are completed for the feed motor 21 and the spinner motor 26 across the high voltage source L1—L2. The trimmer motor 32, the electrode control solenoid 18, the pull up drum solenoid 30, and the reel solenoid 37 are not energized in the "test" position of the master manual switch 44. Hence, in this position, the action of the cross wire feed mechanism may be tested or adjusted without incurring any movements of the line wires or any welding of the cross wires to the line wires.

As will be recognized by those skilled in the art, it is oftentimes desirable to make minute adjustments of the relative angular positions of the mechanisms driven by the feed motor 21, the spinner motor 26, and the trimmer motor 32. For this purpose, jogging switches J1, J2, and J3, are suitably connected respectively in circuit with such motors so that the manual closing of such switches will permit independent operation of any one of the motors when the blade of manual master control switch 44 is in its "off" position.

With the described circuit arrangement, it is apparent that if the locking relay 46 were not provided, then the manual actuation of the master switch 44 to its "off" position from the "run" position could conceivably occur during that interval in which welding current is being supplied to the wire junctures. The self-locking effect exerted by the contacts 46a of the locking relay 46 prevent this occurrence and insure that the electrodes will remain in squeezing engagement with the wire junctures, and hence, in effect, insures that the welding current elements of the machine will remain in operation under the control of the master cam 24 to complete any particular weld that is started while the contacts of the cam switch are closed.

From the foregoing description, it is apparent that this invention provides an unusually simplified, yet extremely effective control circuit for synchronously controlling all of the various prime movers required for the successful operation of a fence making welding machine. The described control circuit insures that welding current will not be supplied to the wire junctures until the application of a squeezing pressure thereto by the cooperating electrodes and that such current will be interrupted prior to release of such squeezing pressure. Furthermore, the described circuit will not permit the machine to be stopped in the middle of a weld but the machine will continue to operate to complete any weld irrespective of the shifting of the master manual switch to the "off" position so that the possibility of producing a fence with a partially welded cross wire due to manual interruption of the machine is completely eliminated.

It will, of course, be understood that various details of construction may be modified through a wide range without departing from the principles of this invention and it is, therefore, not the purpose to limit the patent granted hereon otherwise than necessitated by the scope of the appended claims.

I claim as my invention:

1. Electrical control for a fence welding machine having motor means for feeding cross and line wires to a welding position, solenoid controlled relatively movable electrodes, and welding current timing mechanism controlling the duration of current flow through said electrodes, comprising, in combination, manually controlled means for energizing said feed motor means, a cam driven in timed relation with said feed motor means, a first switch cyclically opened and closed by said cam, first relay means responsive to operation of said first switch for actuating said electrode control solenoids to move said electrodes together to contact the wire, a second switch actuated by said movement of said electrodes to wire engaging position, and second relay means responsive to operation of said second switch for energizing said welding current timing means, whereby successive cross wires are applied to the line wires, squeezed between said electrodes and a controlled welding current applied thereto.

2. An electrical control for a fence welding machine having motor means for feeding cross and line wires to a welding position, solenoid controlled relatively movable electrodes, and welding current timing mechanism controlling the duration of current flow through said electrodes, comprising, in combination, manually controlled means for energizing said feed motor means, a cam driven in timed relation with said feed motor means, a first switch cyclically opened and closed by said cam, first relay means responsive to operation of said first switch for actuating said electrode control solenoids to move said electrodes together to contact and squeeze the line and cross wire junctures, a second switch actuated by said movement of said electrodes to wire-engaging position, and second relay means responsive to operation of said second switch for energizing said welding current timing means, said second relay means having delayed response characteristics, whereby welding current is not applied to said electrodes until after a predetermined squeeze time.

3. An electrical control for a fence welding machine having motor means for feeding cross and line wires to a welding position, solenoid controlled, relatively movable electrodes, and welding current timing mechanism controlling the duration of current flow through said electrodes, comprising in combination, manually controlled means for energizing said feeding motor means, a cam driven in timed relation with said feeding motor means, a first switch cyclically opened and closed by said cam, first relay means responsive to operation of said switch for actuating said electrode control solenoids to move said electrodes together to contact and squeeze the wire junctures, a second switch actuated by said movement of said electrodes to wire-engaging position, and second relay means responsive to operation of said second switch for energizing said welding current timing means, whereby successive cross wires are applied to the line wires, squeezed between said electrodes and a controlled welding current applied thereto, said cam being proportioned to retain said electrodes in squeezing relation to the wire junctures for a period exceeding the duration of flow of welding current therethrough.

4. An electrical control for a fence welding machine having motor means for feeding cross and line wires to a welding position, solenoid controlled, relatively movable electrodes, and welding current timing mechanism controlling the duration of current flow through said electrodes, comprising, in combination, manually controlled means for energizing said feed motor, a cam driven in timed relation with said wire feed motor, a first switch cyclically opened and closed by said cam, first relay means responsive to operation of said first switch for actuating said electrode control solenoids to move said electrodes together to contact and squeeze the line and cross wire junctures, a second switch actuated by said movement of said electrodes to wire-engaging position, second relay means responsive to operation of said second switch for energizing said welding current timing means, said second relay means having delayed response characteristics, whereby welding current is not applied to said electrodes until after a predetermined squeeze time, and said cam being proportioned to retain said electrodes in squeezing relation to the wire junctures for a period exceeding the duration of welding current flow therethrough.

5. An electrical control for a fence welding machine having motor means for feeding cross and line wires to a welding position, solenoid controlled relatively movable electrodes, and welding current timing mechanism controlling the duration of current flow through said electrodes, comprising, in combination, manually controlled master switch means for directly energizing said feed motor means, a cam driven in timed relation with said feed motor means, a cam switch opened and closed by said cam, first relay means responsive to closure of both said master switch means and said cam switch for actuating said electrode control solenoids to move said electrodes together to contact the line and cross wire junctures, a locking relay energized through said master switch means and said cam switch to complete a locking circuit for itself and said first relay means around said manual master switch, whereby deenergization of said first relay means is controlled entirely by said cam switch, a second switch actuated by said movement of said electrodes to wire engaging position, and second relay means responsive to operation of said second switch for energizing said welding current timing means, whereby successive cross wires are applied to the line wires, squeezed between said electrodes and a controlled welding current applied thereto, and every weld initiated is completed irrespective of the opening of said master switch means.

6. Electrical control for a fence welding machine having motor means for successively positioning cross and line wires in a welding position and welding current control means comprising a manually controlled switch for energizing said motor means and said welding current control means, cam switch means for synchronizing the operation of said welding current control means with said motor means, and relay means responsive to said cam switch means for maintaining the energization of said welding current control means independently of said manually controlled switch, whereby any weld initiated is completed irrespective of actuation of said manually controlled switch.

HARRY E. GRIESEMER.

REFERENCES CITED

The following references are of record in the file of this patent:

UNITED STATES PATENTS

| Number | Name | Date |
|---|---|---|
| 2,046,131 | Powell et al | June 30, 1936 |